United States Patent [19]

Heitz et al.

[11] Patent Number: 4,835,244

[45] Date of Patent: May 30, 1989

[54] SUBSTITUTED AROMATIC POLYESTERS

[75] Inventors: Walter Heitz, Kirchhain; Wilhelm Brügging, Marburg, both of Fed. Rep. of Germany

[73] Assignee: Bayer Aktiengesellschaft, Leverkusen, Fed. Rep. of Germany

[21] Appl. No.: 200,257

[22] Filed: May 31, 1988

[30] Foreign Application Priority Data

Jun. 12, 1987 [DE] Fed. Rep. of Germany ....... 3719577

[51] Int. Cl.⁴ .............................................. C08G 63/18
[52] U.S. Cl. .................................. 528/176; 525/437; 528/182; 528/271
[58] Field of Search ...................... 528/176, 182, 271; 525/437

[56] References Cited

U.S. PATENT DOCUMENTS 4,764,583  8/1988  Fukui et al. ........................ 528/176
4,767,830  8/1988  Kageyama et al. ................. 528/176

Primary Examiner—Harold D. Anderson
Assistant Examiner—T. Mason
Attorney, Agent, or Firm—Connolly and Hutz

[57] ABSTRACT

This invention relates to polyesters corresponding to formula (I)

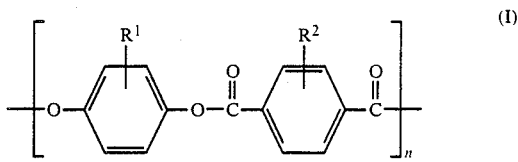

wherein
R¹ and R² stand for —CH$_2$—CH$_2$—Ar wherein Ar denotes an aromatic group or one of these two groups is —CH$_2$—CH$_2$—Ar while the other is an alkyl group, a substituted alkyl or an aryl group or halogen and
n represents an integer with a value from 5 to 2000, and to a process for their preparation.

2 Claims, No Drawings

SUBSTITUTED AROMATIC POLYESTERS

This invention relates to polyesters based on alkylaryl-substituted terephthalic acids and alkylaryl substituted hydroquinones, to a process for their preparation and to their use for the preparation of molecularly reinforced polymers.

It is known that various polymers have only a limited capacity if any for mixing with each other molecularly. Thus, for example, when mixtures of two different polymers are prepared at an elevated temperature, they are liable to separate into domains on cooling. This applies particularly to mixtures of liquid-crystalline polymers in other polymers.

It has now been found that specially substituted polyesters of hydroquinone and terephthalic acid are miscible and compatible with many other polymers and for homogeneous solutions and mixtures with each other over a wide temperature range of from −30° C. to 250° C.

The present invention therefore relates to new polyesters corresponding to formula (I)

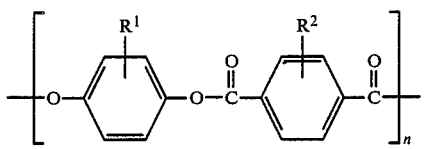

(I)

wherein
R$^1$ and R$^2$ stands for —CH$_2$—CH$_2$—Ar wherein Ar stands for an aromatic group or one of these two groups is —CH$_2$—CH$_2$—Ar while the other is an alkyl group, a substituted alkyl or an aryl group or halogen and
n represents an integer with a value from 5 to 2000.

When R$^1$ and R$^2$ stand for CH$_2$—CH$_2$—Ar, Ar is preferably an aryl group with 6 to 12 carbon atoms, such as phenyl, naphthyl, tolyl or xylyl.

When R$^1$ and R$^2$ stand for alkyl, the alkyl group is preferably a C$_1$ and C$_6$ alkyl group such as methyl, ethyl, isobutyl or tertiary butyl. When R$^1$ or R$^2$ stand for aryl, this is preferably phenyl, and a substituted alkyl group is preferably a perfluoroalkyl group such as trifluoromethyl and the preferred halogen is chlorine.

The new polyesters have molecular weights M$_n$ from 2500 to 10$^6$, preferably from 5000 to 500,000.

The invention also relates to a process for the preparation of the polyesters of formula (I), characterised in that (a) hydroquinones corresponding to formula (II)

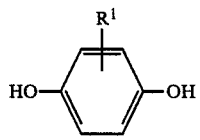

(II)

wherein R$^1$ has the meaning indicated for formula (I) are reacted with terephthalic acid derivatives such as the halides of formula (III)

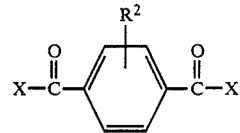

(III)

wherein
R$^2$ has the meaning indicated for formula (I) and
X stands for a halogen such as Cl or Br at temperatures from 0° to 300° C., preferably at 20° to 250° C., optionally in conventional organic solvents and optionally in the presence of at least equivalent quantities of a tertiary amine (based on the terephthalic acid derivative of formula (III) or (b) acylated hydroquinones corresponding to formula (IV)

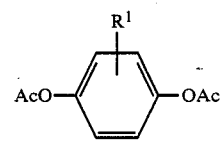

(IV)

wherein
R$^1$ has the meaning indicated for formula (I) and
Ac stands for C$_1$-C$_{10}$ alkyl-CO is reacted with terephthalic acids corresponding to formula (V)

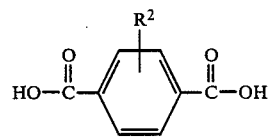

(V)

wherein R$^2$ has the meaning indicated for formula (I) optionally in conventional organic solvents at temperatures from 50° to 350° C. or in the molten state in the absence of solvents at temperatures from 50° to 400° C. or (c) hydroquinones corresponding to formula (II) are reacted with esters, preferably aryl esters or terephthalic acid corresponding to formula (VI)

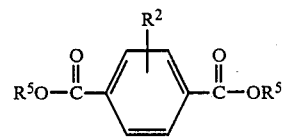

(VI)

wherein
R$^5$ stands for C$_1$ to C$_4$ alkyl, C$_6$ to C$_{24}$ aryl or C$_7$ to C$_{30}$ aralkyl or alkylaryl, preferably C$_6$ to C$_{24}$ aryl, and R$^2$ has the meaning indicated above in the presence of conventional transesterification catalysts in conventional solvents, optionally under a vacuum of from 0.1 to 10$^{-4}$ bar.

The conventional organic solvents suitable for methods (a), (b) and (c) are, for example, chlorinated hydrocarbons such as carbon tetrachloride, perchloroethylene, chloroform and dichloromethane, aromatic solvents such as toluene, diphenyl ether, chloronaphthalene and diphenyl sulphone and ketones such as acetone and butanone.

Method (a) may be carried out in the presence or absence of bases. If bases are added, tertiary amines such as pyridine, triethylamine, etc. should be present in at least equivalent quantities, based on the terephthalic halide. The tertiary amine may optionally be used as solvent.

The solution of the terephthaloyl halide, e.g. in toluene, is added dropwise to the solution of the substituted hydroquinone in, for example, toluene/pyridine, and the solution is then heated for 1 hour, e.g. to temperatures of 100° C. The polymer is filtered off and is freed from organic solvents and from salts by washing with water and alcohol (e.g. methanol).

In method (c), a conventional catalyst capable of influencing transesterification reactions should be present in the reaction mixtures is quantities of from 0.001 to 0.1 mol, based on the terephthalic acid ester of formula (VI). Conventional transesterification catalysts may be used, e.g. metal salts and compounds such as manganese acetate, zinc chloride, titanium tetrapropylate or tin dibutyl dilaurate or catalyst combinations such as zirconium tetrapropylate/4-dimethylaminopyridine or metals such as magnesium. The reaction is carried out in high boiling solvents such as naphthalene methyl ether or, preferably, without solvents. The reaction components are heated for 1 to 5 hours to about 300° C., preferably to a temperature just below the melting point of the polymer formed in the reaction, and after-condensation is carried out at 280° to 350° C. under reduced pressure.

About 1 mol of terephthalic acid of formula (V) is used per mol of hydroquinone of formula (II).

The polymerisation reactions (a), (b) and (c) may be carried out in the usual manner.

The polymers according to the invention may be regarded as liquid-crystalline polymers but unlike known liquid-crystalline polymers they are not highly crystalline, difficultly soluble or incompatible with other polymers.

On the contrary, the polymers according to the invention may be dissolved in other polymers (molecular disperse) in quantities of from 0.5 to 20% by weight (based on the other polymer with which it is to be mixed).

The polymers according to the invention may be incorporated in numerous other polymers, e.g. in polycarbonates, polyepoxides, ABS, polyphenylene sulphide, polyether ether ketones, polyamide, polyesters, polyethylene, PVC, polyurethanes, ABN rubbers and ethylene/vinyl acetate copolymers.

To incorporate the polymers according to the invention, they may be heated to elevated temperatures of up to about 400° C. together with the polymers with which they are to be mixed, e.g. after grinding. A homogeneous mixture (alloy) is obtained after cooling to room temperature.

The polymer mixtures prepared with the polymers according to the invention have excellent dimensional stability under heat over a wide temperature range from −100° C. to about 200° C., high values for notched impact strength, moduli of elasticity and scratch resistance and excellent shear strength.

The polyesters according to the invention corresponding to formula (I) may be dissolved, for example, in a monomer such as styrene, methylstyrene, methylmethacrylate, epoxides, diisocyanate/diol systems or monomer mixtures such as styrene/acrylonitrile, etc. and these solutions are then polymerised. Polymerisation of monomers is carried out under the usual conditions. Thus vinyl monomers are polymerised by the addition of radical initiators, epoxides by the addition of polyamines and diisocyanate/diol systems by the addition of tin catalysts. A good polymer/polymer mixture is obtained. Mixing may also be carried out by means of a common solvent.

By virtue of their profile of properties, such mixtures are suitable for numerous applications, e.g. for the production of materials, injection cast types, foils, films, fibres and threads, etc.

EXAMPLE 1

Preparation of a polyester of 1(2-phenyl)-ethylterephthaloyl dichloride and 1(2-phenyl)-ethylhydroquinone by melt condensation 1.1753 g ($\Delta$ 3.826 mmol) of 1(2-phenyl)ethylterephthaloyl dichloride and 0.8178 g ($\Delta$3.817 mmol) of 1(2-phenyl)ethylhydroquinone were introduced into a 50 ml nitrogen flask which had been annealed and rinsed with nitrogen and which was equipped with a bubble counter and magnetic stirrer rod. The reaction mixture was heated to 100° C. with continuous stirring under a weak stream of nitrogen. Vigorous evolution of gas occurred. After a reaction time of 2 hours, the homogeneous reaction mixture had become highly viscous. The temperature was raised to 160° C. and kept there for 1.5 hours. It was then raised to 250° C. After 1 hour at this temperature, the reaction mixture was cooled to room temperature, an oil pump vacuum ($10^{-2}$ torr) was applied and the contents of the flask were slowly reheated to 250° C. This temperature was maintained for 4 hours and the experiment was then stopped.

Crude yield: 1.68 g $\Delta$ (97.7% of theoretical).

The crude product was completely dissolved in about 50 ml of chloroform and precipitated in 600 ml of methanol. The dry precipitate recovered was slightly yellow and weighed 1.65 g (95.9% of theoretical).

The following results were obtained from viscosity measurements on the reprecipitated product:

$\eta_{inh}$=2.20 (P-chlorophenol, 45° C.), $\eta_{inh}$=2.29 (chloroform, 45° C.).

EXAMPLE 2

Preparation of a polyester of 1(2-phenyl)-ethylterephthaloyl dichloride and 1(2-phenyl)-ethylhydroquinone by polycondensation in solution.

20.0 g of diphenyl ether, 1.0985 g ($\Delta$ 3.576 mmol) of 1(2-phenyl)-ethylterephthaloyl dichloride and 0.7658 g ($\Delta$ 3.574 mmol) of 1(2-phenyl)-ethylhydroquinone were introduced into a 50 ml nitrogen flask which had been annealed and rinsed with nitrogen and which was equipped with à magnetic stirrer rod, reflux condenser and bubble counter attachment. The reaction mixture was heated to 180° C. with continuous stirring under a weak stream of nitrogen (evolution of gas). After 1 hour, the reaction temperature was slowly rinsed to 250° C. This temperature was maintained for 5.5 hours and the reaction was then stopped. The reaction solution was homogeneous and stirrable throughout the reaction time. The reaction mixture, which is solid at room temperature, was dissolved in about 20 ml of chloroform and the polymer was precipitated in 600 ml of methanol. The polymer precipitate was filtered off, washed, dried and again reprecipitated (100 ml chloroform/1000 ml methanol). The yield was 1.55 g (96.8% of theoretical). The product has an inherent viscosity of $\eta_{inh} = 1.42$ (chloroform, 45° C.).

What is claimed is:

1. Polyester having repeating unit corresponding to formula (I)

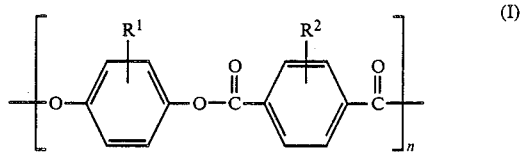

wherein
R$^1$ and R$^2$ represents —CH$_2$—CH$_2$—Ar in which Ar is an aromatic group or one of the two groups denoted by R$^1$ and R$^2$ is —CH$_2$—CH$_2$—Ar and the other is an alkyl group, a substituted alkyl or aryl group or halogen and n represents an integer with a value from 5 to 2000.

2. Polyester according to claim 1 wherein both R$^1$ and R$^2$ are each —CH$_2$—CH$_2$—Ar wherein Ar is phenyl.

* * * * *